(No Model.) 2 Sheets—Sheet 1.
G. P. DINEEN.
SELF ACTING APPARATUS FOR WORKING POINTS AND SIGNALS UPON RAILWAYS.
No. 363,613. Patented May 24, 1887.
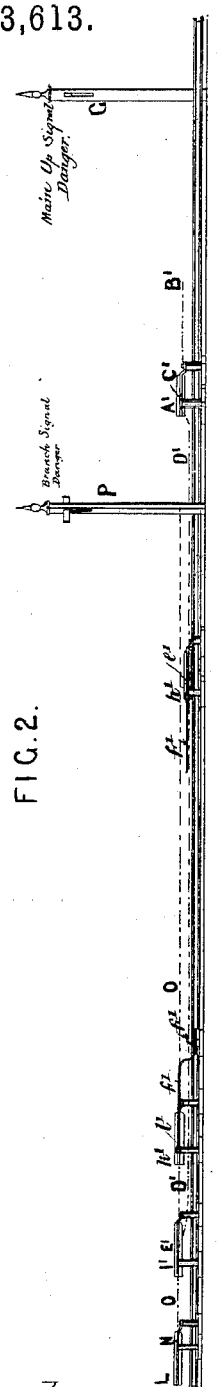
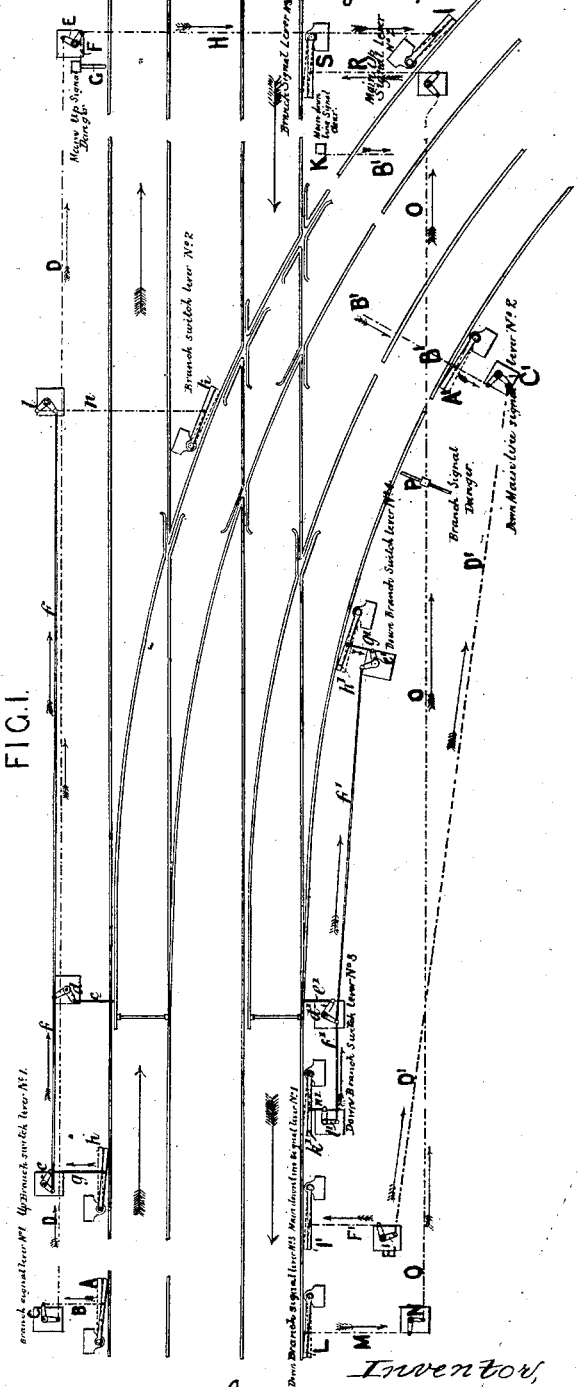

(No Model.) 2 Sheets—Sheet 2.
G. P. DINEEN.
SELF ACTING APPARATUS FOR WORKING POINTS AND SIGNALS UPON RAILWAYS.
No. 363,613. Patented May 24, 1887.
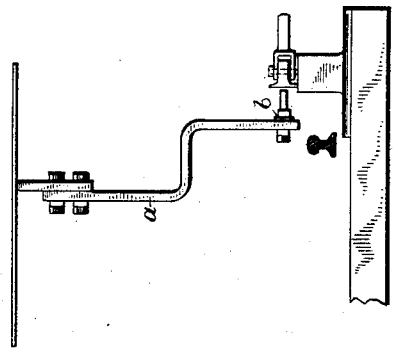
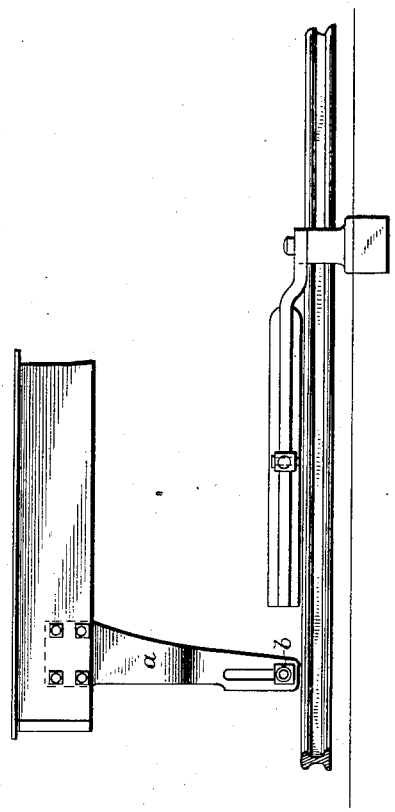

UNITED STATES PATENT OFFICE.

GEORGE P. DINEEN, OF TOTTENHAM, COUNTY OF MIDDLESEX, ASSIGNOR OF ONE-HALF TO ARTHUR ROWE, OF PECKHAM RYE, COUNTY OF SURREY, ENGLAND.

SELF-ACTING APPARATUS FOR WORKING POINTS AND SIGNALS UPON RAILWAYS.

SPECIFICATION forming part of Letters Patent No. 363,613, dated May 24, 1887.

Application filed June 15, 1886. Serial No. 205,291. (No model.)

*To all whom it may concern:*

Be it known that I, GEORGE PETER DINEEN, a subject of the Queen of Great Britain, residing at Tottenham, in the county of Surrey, England, have invented certain new and useful Improvements in Self-Acting Apparatus for Working Points and Signals on Railways and Tramways, of which the following is a specification.

According to this invention I work the points and signals from the front and the rear of the train itself by means of suitable projecting fixed parts, which consecutively come in contact with corresponding movable or shifting parts arranged by the side of the line and connected to bars for shifting the points and wires or bars for working the signals, such projecting fixed parts being set in fixed positions before the trains start from the terminus. I thus remove all responsibility from pointsmen and signalmen. As an example, I will describe the invention with reference to the accompanying drawings, in which—

Figure 1 is a plan of main and branch line points with automatic devices for working same and the signals, and Fig. 2 a side view. Figs. 3 and 4 are a side and an end view, respectively, of the automatically-actuating parts on the train and on the line.

I suppose, for example, that the upper line, Fig. 1, is the down line. I provide the engine at the front and the brake van at the rear of the train, which is intended to turn off at a certain branch line, with a horn or bar—such, for instance, as $a$, Figs. 3 and 4—which has a slot for receiving one or more projecting pegs. Such a peg, $b$, fixed in the horn $a$ on the brake-van in the rear, will come in contact with and shift into the dotted position the lever A, Fig. 1, which, by rod B, bell-crank lever C, rod D, bell-crank lever E, and rod F, work the main up signal G, turning it into the up or danger position. To the bell-crank lever E is also connected a rod, H, which is connected with a lever, I, which thereby is shifted into the dotted position.

It must here be noted that the shifting lever A is placed a sufficient distance in advance of the branch-line points. A peg on a horn on the engine—which peg is placed at another level than the peg $b$ on the brake-van—next comes in contact with and shifts into the dotted position the lever $h$, which, by means of the levers $d$ and $e$ and rods $g$, $f$, and $c$, shifts the points for and opens the branch line. These levers or shifting or moving parts are arranged by the side of the main line at a short distance from the branch-line points, and at such a level that the peg on the aforesaid horn or bar on the engine, as it passes by, comes in contact with and shifts the lever $h$. The branch-line train is thus properly and automatically guided onto the branch line, and the aforesaid projecting peg $b$, fixed in the horn on the brake-van, will, when the brake-van has quite passed the points, come in contact with a lever, $k$, or other shifting or moving part arranged at the proper level by the side of the branch line, and also by bell-crank levers $l$ and $d$ and rods $f$ and $n$, connected to the points, whereby these are shifted back to their original position, so as to leave the main line clear. The same peg on the brake-van horn next comes in contact with and moves the lever I, which, by means of the rod H, lever E, and rod F, is carried up to the main up-line signal-post G, and lowers the arm to "clear." It will thus be understood that with the shifting of the points the signals are also worked to block the main up line clear until the branch-line down train is perfectly clear of the crossing on the up line.

For a branch-line train coming in the opposite direction similar signal and point shifting levers and gear are arranged, viz: The peg on the rear brake-van shifts the lever A', which by rod B' puts the rear main up-line signal K to "danger," and also by bell-crank lever C' and wire or rod D' shifts the lever I' into the dotted position. The lever $h'$ is next by the peg on the engine turned into the dotted position, whereby, through the rods $g'$, $f'$, and $c'$ and the levers $e'$ and $d'$, the points are shifted and opened for the branch up train to proceed onto the main up line. The continuation of the rod $f'$ is by lever $l'$ and rod $n'$ connected to a shifting lever, $k'$, which is brought into the dotted position, but is by the peg on the brake-van brought back into its former position, thus closing the points to the branch line when the train has fully passed the points. Next the peg on the brake-van comes in contact with the lever I', pushes it out, and through the wires or rods F', D', and B' and the levers E' and C' shifts the shifting lever A' in and lowers the main-line rear signal, K. A main-line up train coming along will next, by means of a peg fixed similarly on its brake-van, shift the lever S, which, by rods R and O and lever Q, shifts the double signal P to "danger," thus blocking both branch lines. The same peg will next shift the lever L, and by the wires or rods M and O and the bell-crank N lower the double signal P.

It will be understood that the trains for the main line are not provided with horns or projecting parts for moving the points; but the main and branch lines may be provided with the ordinary block system of signals, a peg on the brake-van coming in contact with and working levers or shifting or moving parts, which are so connected with other signals as to work them to close one signal after another as the train passes same and to open the preceding one.

It will also be understood that where there are two or more branch lines the movable parts for working the points are arranged in different positions relatively, but so as to correspond each with the projections or horns on its proper branch-line train, while being unaffected by any other.

The signals may be telegraphically connected in the home signals or station, so as to indicate the position of the train automatically.

It will thus be seen that the train automatically blocks the line in rear, and as regards a branch line works its points. In case of several branches from the same main line or from a branch line, it will be understood that the engine is to be fitted with pegs at different levels corresponding with the shifting levers that have to be moved. It will be noticed that all the shifting levers A h k, &c., are shown so long that the actuating-pegs hold them in position sufficiently long after being moved as to counteract the effect of any vibration.

I do not specifically or separately claim any mechanism hereinbefore described and shown; but

I claim—

1. The herein-described system of signals, which consists in the combination, with two main lines and two lines branching therefrom for trains running in reverse directions, of a signal for each main line and an actuating-lever operated by the trains before entering a branch line from a main line or a main line from a branch line to block said main lines, a signal for both branch lines, and an actuating-lever operated by the trains on that main line which is connected with one of the branch lines and crosses the other to block both branch lines, and actuating-levers for all of said signals operated by the trains on leaving their respective blocked sections to return the signals to "safety," substantially as described, for the purpose specified.

2. The herein-described system of signals and switch shifting devices, which consists in the combination, with two main lines and two lines branching therefrom for trains running in reverse directions, of a signal, a switch, switch-shifting devices for each main line, and actuating-levers operated by the trains before entering a branch line from a main line and before entering a main line from a branch line to first set the signals of the main lines to "danger," then shift the switches into position for the passage of the train from the main line into a branch line, and vice versa, a signal and actuating-lever operated by a train on that main line which crosses one of the branch lines to block both the latter lines, and actuating-levers operated by the trains on leaving their respective blocked sections to return the switches into their normal positions and the signals to "safety," substantially as and for the purpose specified.

3. The herein-described system of signals and switch-shifting devices, which consists in the combination, with two main lines and two lines branching therefrom for trains running in reverse directions, of signals for each main line, and actuating-levers operated by the trains on the main lines to block the latter in front and in rear of said trains, a signal, a switch, switch-shifting devices for each main line, and actuating-levers operated by the trains before entering a branch line from a main line and before entering a main line from a branch line to first set the latter signals of the main lines to "danger," then shift the switches into position for the passage of the train from the main line into a branch line, and vice versa, a signal and actuating-lever operated by a train on that main line which crosses one of the branch lines to block both the latter lines, and actuating-levers operated by the trains on leaving their respective blocked sections to return the switches into their normal positions and their respective signals to "safety," substantially as and for the purpose specified.

G. P. DINEEN.

Witnesses:
   C. A. JENSEN,
      77 *Chancery Lane.*
   WALTER J. SKERTEN,
      17 *Gracechurch St., London.*